(12) United States Patent
Allen et al.

(10) Patent No.: US 7,284,305 B1
(45) Date of Patent: Oct. 23, 2007

(54) APPARATUS AND PROCESS FOR AUTOMATICALLY CUTTING TEXTILE WEB WITH REDUCED WRINKLING

(75) Inventors: Phillip Allen, Greenwood, SC (US); John H. Deason, McCormick, SC (US); Wayne Wright, McCormick, SC (US); Jimmy Beard, Lincolnton, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 11/652,902

(22) Filed: Jan. 12, 2007

(51) Int. Cl.
*B26D 7/14* (2006.01)

(52) U.S. Cl. .................................. 26/7; 26/51

(58) Field of Classification Search ............... 26/7, 26/51, 9, 10.4, 11, 12, 51.3, 71; 83/949, 83/649, 156, 175; 219/121.67, 121.72, 121.68, 219/121.7; 242/410, 615.21, 364; 226/195
See application file for complete search history.

(56) References Cited

U.S. PATENT DOCUMENTS

| | | | | |
|---|---|---|---|---|
| 2,612,950 A | * | 10/1952 | Ewing | 83/175 |
| 3,226,527 A | * | 12/1965 | Harding | 219/384 |
| 3,304,820 A | * | 2/1967 | Muller et al. | 83/25 |
| 3,411,684 A | * | 11/1968 | Roger et al. | 226/25 |
| 3,456,540 A | * | 7/1969 | Benito | 83/319 |
| 3,486,957 A | * | 12/1969 | Cooper et al. | 156/88 |
| 3,606,127 A | * | 9/1971 | Brown | 226/190 |
| 3,614,369 A | * | 10/1971 | Medley | 83/18 |
| 3,755,861 A | * | 9/1973 | Castro et al. | 26/74 |
| 4,381,586 A | * | 5/1983 | Abler | 26/2 E |
| 5,626,066 A | | 5/1997 | Lallement | 83/451 |
| 5,867,392 A | | 2/1999 | Bousquet | 700/167 |
| 5,975,743 A | | 11/1999 | Bercaits | 700/134 |
| 6,521,074 B1 | | 2/2003 | Chabirand Garconnet et al. | 156/248 |
| 6,737,607 B2 | | 5/2004 | Nicholas et al. | 219/121.7 |
| 2001/0045147 A1 | * | 11/2001 | Schultes | 83/13 |

* cited by examiner

*Primary Examiner*—Amy B. Vanatta
(74) *Attorney, Agent, or Firm*—Terry T. Moyer; Cheryl J. Brickey

(57) ABSTRACT

The present invention generally relates to an apparatus and process for automatically cutting a textile web with reduced wrinkling. The process includes passing the textile web across a first guide roller having a first guide surface directing the textile web to the tension roller, passing the textile web across a let-off roller on the let-off roller surface to compensate for web tension fluctuations as the web textile is passed, moving the textile web from the let-off roller surface in tension around a portion of the tension roller and in contact with the exterior surface of the tension roller, passing the textile web across a conveyor guide surface directing the textile web from the tension roller to an automatic laser cutting apparatus, and cutting the textile web in a predetermined pattern in an automatic laser cutting apparatus comprising a cutting table, a movable laser cutting tool, and a vacuum system, wherein the cutting table comprises a perforated conveyor belt having a conveyor guide surface for directing the textile web from the tension roller and wherein the textile web is held by suction to the conveyor by the vacuum system. The angle formed from the let-off roller surface normal to the ground and the textile web from the let-off roller to the tension roller is from about 2 to 25 degrees. The tension roller holds the textile web in 0.2 to 0.6 pounds per linear inch. The apparatus for automatically cutting a textile web with reduced wrinkling is also disclosed.

17 Claims, 1 Drawing Sheet

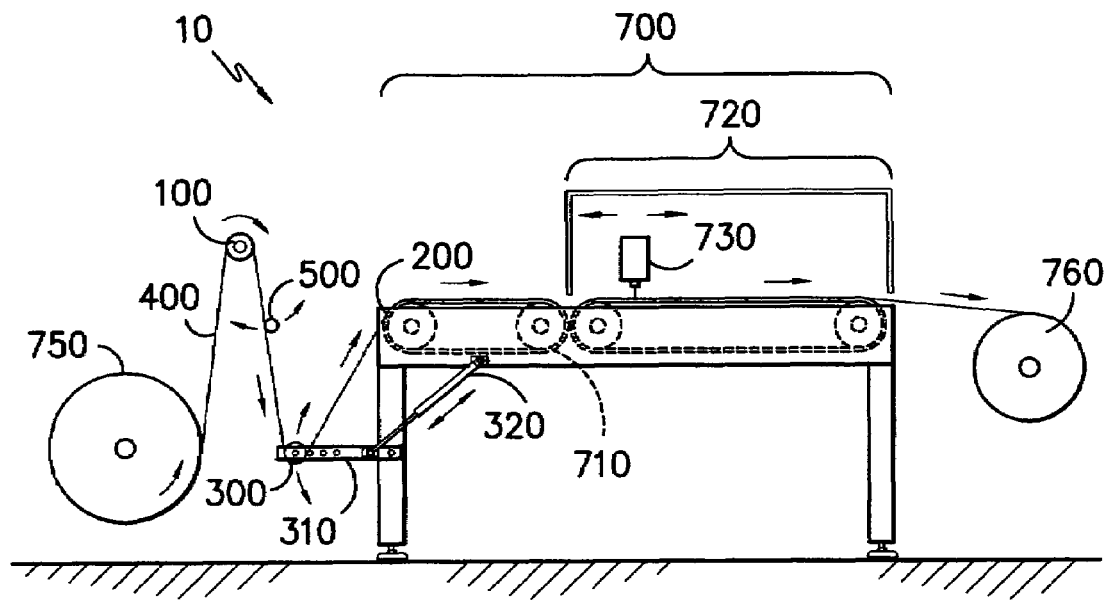
FIG. -1-
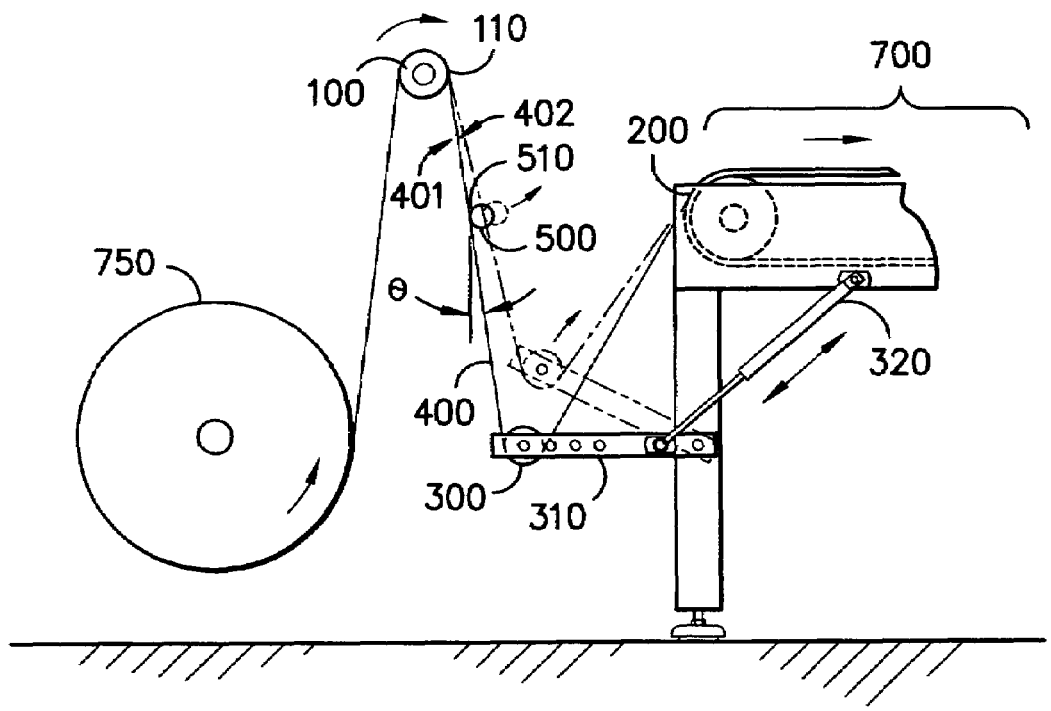
FIG. -2-

APPARATUS AND PROCESS FOR AUTOMATICALLY CUTTING TEXTILE WEB WITH REDUCED WRINKLING

TECHNICAL FIELD

The present invention generally relates to an apparatus and process for automatically cutting a textile web with reduced wrinkling.

BACKGROUND

A well known method of cutting out pieces from a flexible sheet material consists in bringing the sheet material onto a table in a cutting-out zone, either as a single ply or as a plurality of superposed plies forming a lay-up, and in cutting out pieces in compliance with a pre-established layout by means of a tool which penetrates into the material or laser cuts the material while the sheet material is held against the table by suction. The suction is obtained by sucking through the surface of the table. It has been known for a long time to use a laser as cutting tool more particularly for materials in sheet form. To that end, a laser source is available, generating a light beam, which is directed by means of mirrors towards the zone of cut. Before it reaches the plane of cut, there is interposed on its path a focusing lens whose role is to concentrate the light beam into a spot of very small diameter, which furnishes a very high density of energy. Very different materials may thus be cut out provided that the thicknesses are not too great.

In many systems, the fabric to be cut is pulled onto the laser cutting table with wrinkles. This causes off quality pieces and inaccurate cuts. In the case of air bags, these miss-cuts cause lost time, money, and a safety risk.

Therefore, there is a need for a process and an apparatus to automatically laser cut a textile web with reduced wrinkling and more accurate cutting.

BRIEF DESCRIPTION OF THE DRAWINGS

An embodiment of the present invention will now be described by way of example, with reference to the accompanying drawings.

FIG. 1 is a schematic of one embodiment of an installation for automatically cutting textile webs with reduced wrinkling;

FIG. 2 is a side end view drawing of the tension roller configuration.

DETAILED DESCRIPTION

Referring to FIG. 1, there is shown an installation 10 for automatically cutting textile webs with reduced wrinkling incorporating a tension roller 300. As illustrated, the tension roller 300 is located after the unwind roller 750 the first guide roller 100, and the let-off roller 500, but before the automatic laser cutting apparatus 700. Having the tension roller 300 with specific placement relative to the let-off roller 500 and tension parameters incorporated into the installation 10 reduces wrinkles in the fabric leading to more accurate cutting by the automatic laser cutting apparatus 700.

The tension roller 300 in one embodiment is attached to the installation 10 by a tension arm 310 and a tensioning device 320. An air compression spring is shown in FIG. 1 as the tensioning device, but the tensioning device may also be, but is not limited to a mechanical spring, an electronic load cell, a hydraulic pressure cylinder, or an oil based cylinder.

The tension roller moves up and down relative to the installation applying pressure to the textile web 400 to maintain tension in the textile web 400 and reduce wrinkling of the textile web 400. The tension roller applies 0.2 to 0.6 pounds per linear inch pressure to the textile web, more preferably about 0.35 to 0.50 pounds per linear inch. When the pressure is too high, the tension roller 300 bottoms out, meaning that the tensioning device 320 is fully extended and the tension roller 300 can not longer adjust to provide constant pressure to the textile web 400 and the textile web may have too much tension and therefore slip as the conveyor belt 710 attempts to advance the textile web. If the pressure is too low, the textile web may not be held in high enough tension and the textile web 400 may wrinkle as it enters the laser cutting apparatus 700 causing miss-cuts. Preferably, the tension in the textile web 400 is maintained at a substantially constant tension.

FIG. 1 also shows optional unwind system 750 and windup system 760. Although rollers are shown for the unwind system and windup system, other known unwind and windup systems may also be used including additional dancer bars and safety equipment. For example, the windup system 760 may be where the cut pieces are stacked together and the waste is collected to be discarded.

Referring now to FIG. 2, a section of the installation 10 containing the tension roller 300 is shown enlarged. Also shown is the first guide roller 100, the let-off roller 500 and the conveyor guide surface 200. The first guide roller 100 has a first guide surface 110 that guides the textile web 400 from the first guide 100, past the let-off roller surface 510 to the tension roller 300. The conveyor guide surface 200 guides the textile web 400 from the tension roller 300 to the conveyor of the automatic laser cutting apparatus 700 (not fully shown). The let-off surface 510 of the let-off roller 500 is the last surface that the textile web 400 contacts before the tension roller 300. The conveyor guide surface 200 is the first surface that the textile web 400 contacts after the textile web 400 leaves the tension roller 300. The first guide roller 100 and conveyor guide surface 200 may be of any form that guides the textile web 400 to and from the tension roller 300, including, but not limited to a drive roller, an idle roller, a stationary roller, a cylinder, the textile, a bar, or a wire.

The let-off roller 500 serves to control the amount of textile and when the textile web 400 is advanced from the unwind system through the installation 10 acting as a dancer roller moving forward to back (as shown in FIG. 1). The tension roller installation must not interfere with the function of the let-off roller 500. The angle θ shown in FIG. 2 is formed between a first line running from the let-off roller surface 510 to the ground such that the line is perpendicular or normal to the ground and the line formed by the textile web 400 traveling between the let-off roller surface 510 and the tension roller 300. This angle θ is between about 2 and 25 degrees, more preferably between about 5 and 15 degrees. It has been found this range produces an installation 10 with reduced wrinkling from the addition of the tension roller and correct and accurate feeding of the textile web 400 through the installation 10.

Referring back to FIG. 1, there is shown the laser cutting apparatus 700. The laser cutting apparatus 700 generally cuts the textile web 400 based on a predetermined electronic input. The laser cutting apparatus 700 generally includes a perforated conveyor belt 710 that includes the conveyor belt surface 200 and a laser cutting system 720 with a laser cutter 730. The textile web 400 is held by suction to the conveyor belt 710 by a vacuum system for example discussed in U.S. Pat. No. 5,626,066, which is herein incorporated by reference.

The laser cutting system 700 is typically based on a printed or woven pattern or location marker on the textile web 400. In one embodiment, it is a grid pattern woven into the textile web. The laser cutting apparatus has a sensing system, such as an optical camera (not shown) that aligns the textile web correctly. The laser cutting tool 730 uses laser energy to cut the textile web in the preprogrammed pattern. More detailed information on the laser cutting system 700 may be found in U.S. Pat. Nos. 6,737,607, 6,521,074, 5,975,743, and 5,867,392.

Preferably, the tension roller 300 is rigid, meaning that it does not deform or bend in any significant amount in use with the textile web 400 in the installation 10.

FIG. 2 illustrates a method of threading the textile web 400 onto one embodiment of the installation 10. The textile web 400 has a first side 401 and a second side 402. In the embodiment shown in FIG. 2, the first side 401 of the textile web 400 passes across the first guide roller 100 in contact with the external surface of the first guide 100. Next, the second side 402 of the textile web 400 passes by, in contact with, a portion of the let-off roller surface 510 of the let-off roller 500. Next, the second side 402 of the textile web 400 passes around a portion of the tension roller 300 in contact with the exterior surface of the tension roller 300. Then, the first side 401 of the textile web 400 then passes across the conveyor guide surface 200 and into the laser cutting apparatus 700. In other embodiments the textile web may be threaded through the treatment apparatus 10 such that different sides of the textile web 400 passes across the first guide roller 100, let-off roller 500, conveyor guide surface 200 and tension roller 300.

The first guide surface 110, the let-off roller surface 500, the conveyor guide surface 200, and the tension roller 300 are substantially parallel and the textile web 400 passes across each in contact in a direction substantially perpendicular to the axis of the rollers and surfaces. Preferably, the tension roller 300 is at least as wide as the textile web 400.

The textile web 400 may be any textile, including, but not limited to woven, nonwoven, or knit textiles. Woven fabrics are preferred and may be plain weaves, twills or other well-known constructions. Examples of knit fabrics include double knits, jerseys, interlock knits, tricots, warp knit fabrics, weft insertion fabrics, etc. Such fabrics may be constructed from spun or filament yarns or may be constructed by using both types of yarns in the same fabric. The textile may be of any suitable material, including, but not limited to, polyamide, polyester, polypropylene, aramid. In one embodiment, a woven, nylon textile is used which is a commonly used textile for airbags.

The process for automatically cutting a textile web with reduced wrinkling comprising in order:

1) passing the textile web across a first guide roller having a first guide surface directing the textile web to the tension roller;

2) passing the textile web across a let-off roller on the let-off roller surface to compensate for web tension fluctuations as the web textile is passed;

3) moving the textile web from the let-off roller surface in tension around a portion of the tension roller and in contact with the exterior surface of the tension roller;

4) passing the textile web across a conveyor guide surface directing the textile web from the tension roller to an automatic laser cutting apparatus;

5) cutting the textile web in a predetermined pattern in an automatic laser cutting apparatus comprising a cutting table, a movable laser cutting tool, and a vacuum system, wherein the cutting table comprises a perforated conveyor belt having a conveyor guide surface for directing the textile web from the tension roller and wherein the textile web is held by suction to the conveyor by the vacuum system.

The angle formed from the let-off roller surface normal to the ground and the textile web from the let-off roller to the tension roller is from about 2 to 25 degrees and the tension roller holds the textile web in about 0.2 to 0.6 pounds per linear inch.

The invention has been described in detail with particular reference to certain preferred embodiments thereof, but it will be understood that variations and modifications can be effected within the spirit and scope of the invention.

What is claimed is:

1. An installation for automatically cutting a textile web with reduced wrinkling comprising:
   a textile web;
   a first guide roller having a first guide surface for directing the textile web to a tension roller;
   a let-off roller having a let-off roller surface contacting the textile web located between the first guide roller and the tension roller to compensate for web tension fluctuations as the web is passed through the installation;
   a tension roller having a tension roller axis; and
   an automatic laser cutting apparatus comprising a cutting table, a movable laser cutting tool, and a vacuum system, wherein the cutting table comprises a perforated conveyor belt having a conveyor guide surface for directing the textile web from the tension roller and wherein the textile web is held by suction to the conveyor by the vacuum system;
   wherein the angle formed from the let-off roller surface normal to the ground and the textile web from the let-off roller to the tension roller is from about 2 to 25 degrees; and
   wherein the tension roller holds the textile web in about 0.2 to 0.6 pounds per linear inch.

2. The installation of claim 1, wherein the first guide roller has a first guide roller axis, the conveyor guide surface has a conveyor guide axis, and the let-off roller has a let-off roller axis.

3. The installation of claim 2, wherein the first guide roller axis, the conveyor guide axis, the let-off roller axis, and the tension roller axis are substantially parallel.

4. The installation of claim 2, wherein the textile web has a first side and a second side and the textile web passes across the first guide roller and conveyor guide surface on the first side of the textile web and textile web passes across the let-off roller surface and the tension roller on the second side of the textile web.

5. The installation of claim 1, wherein the angle formed from the let-off roller surface normal to the ground and the textile web from the let-off roller to the tension roller is from about 5 to 15 degrees.

6. The installation of claim 1, wherein the tension roller is rigid.

7. The installation of claim 1, wherein tension roller holds the textile web in about 0.35 to 0.50 pounds per linear inch.

8. A process for automatically cutting a textile web with reduced wrinkling comprising in order:
   passing the textile web across a first guide roller having a first guide surface directing the textile web to a tension roller;

passing the textile web across a let-off roller on the let-off roller surface to compensate for web tension fluctuations as the web textile is passed;

moving the textile web from the let-off roller surface in tension around a portion of the tension roller and in contact with the exterior surface of the tension roller;

passing the textile web across a conveyor guide surface directing the textile web from the tension roller to an automatic laser cutting apparatus;

cutting the textile web in a predetermined pattern in an automatic laser cutting apparatus comprising a cutting table, a movable laser cutting tool, and a vacuum system, wherein the cutting table comprises a perforated conveyor belt having a conveyor guide surface for directing the textile web from the tension roller and wherein the textile web is held by suction to the conveyor by the vacuum system;

wherein the angle formed from the let-off roller surface normal to the ground and the textile web from the let-off roller to the tension roller is from about 2 to 25 degrees; and wherein the tension roller holds the textile web in about 0.2 to 0.6 pounds per linear inch.

9. The process of claim 8, wherein the first guide roller has a first guide roller axis, the conveyor guide surface has a conveyor guide axis, and the let-off roller has a let-off roller axis.

10. The process of claim 9, wherein the first guide roller axis, the conveyor guide axis, the let-off roller axis, and the tension roller axis are substantially parallel.

11. The process of claim 9, wherein the textile web has a first side and a second side and the textile web passes across the first guide roller and conveyor guide surface on the first side of the textile web and textile web passes across the let-off roller surface and the tension roller on the second side of the textile web.

12. The process of claim 8, wherein the angle formed from the let-off roller surface normal to the ground and the textile web from the let-off roller to the tension roller is from about 5 to 15 degrees.

13. The process of claim 8, wherein the tension roller is rigid.

14. The process of claim 8, wherein tension roller holds the textile web in about 0.35 to 0.50 pounds per linear inch.

15. The process of claim 9, wherein the textile web moves in contact with the first guide roller and substantially perpendicular to the first guide roller axis, and wherein the textile web moves in contact with the conveyor guide surface and substantially perpendicular to the conveyor guide axis.

16. The process of claim 8, further including the step of unwinding the textile web from an unwind roller before the first guide roller and the step of winding the textile web on a windup roller after the automatic laser cutting apparatus.

17. The process of claim 8, wherein the textile web entering the automatic laser cutting apparatus has fewer wrinkles, than the same installation without the tension roller.

\* \* \* \* \*